Mar. 6, 1923.

H. N. BROWN 1,447,410

SPRING HUB

Filed Oct. 24, 1921

INVENTOR
HARRY NEWMAN BROWN.
PER
ATTORNEYS

Mar. 6, 1923.
H. N. BROWN
SPRING HUB
Filed Oct. 24, 1921
1,447,410
2 sheets-sheet 2
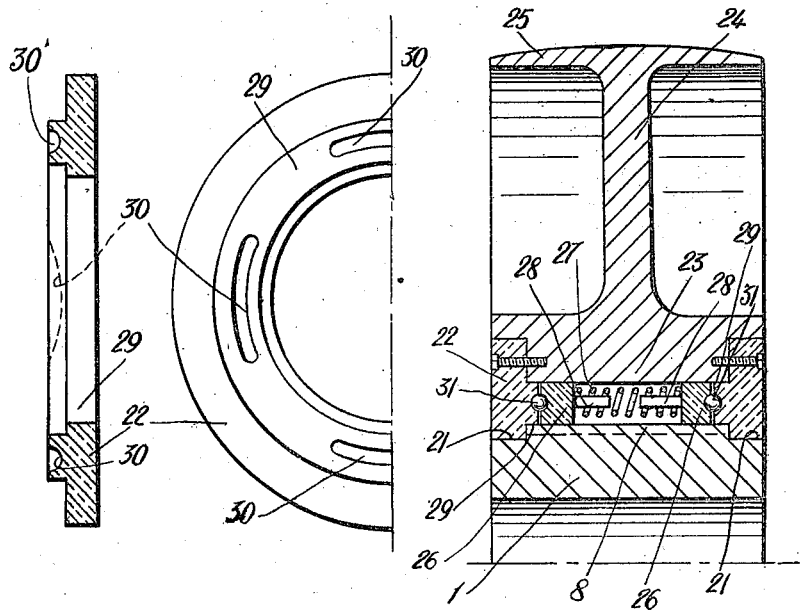
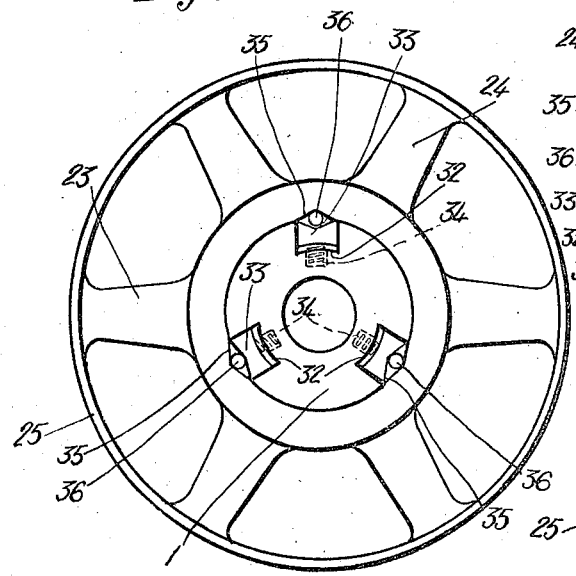
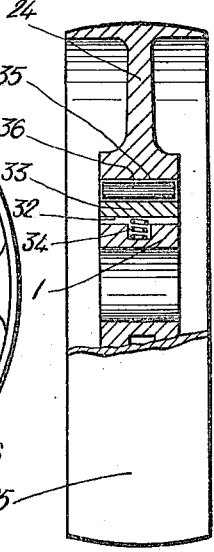
INVENTOR
HARRY NEWMAN BROWN
PER
ATTORNEYS Patented Mar. 6, 1923.

1,447,410

UNITED STATES PATENT OFFICE.

HARRY NEWMAN BROWN, OF PETERBOROUGH, ENGLAND.

SPRING HUB.

Application filed October 24, 1921. Serial No. 510,013.

*To all whom it may concern:*

Be it known that I, HARRY NEWMAN BROWN, subject of the King of Great Britain and Ireland, residing at 22, Lincoln Road, Peterborough, in the county of Northamptonshire, England, have invented certain new and useful Improvements in Spring Hubs, of which the following is a specification.

My invention relates to an improved construction of spring hubs for wheels, pulleys and the like and has for its object to provide a resilient construction of hub to allow the absorption of road shocks and also to provide a cushion drive or shock absorber for the transmission of power from the hub to the wheel rim in the case of wheels for vehicles and simply to provide a cushion drive or shock absorber to permit of the resilient transmission of power from the hub to the rim or vice versa in the case of pulleys and the like.

According to this invention the rim of the wheel or pulley is mounted so as to be free to turn upon the hub and concave or wedge shaped recesses are provided in the hub and the portion of the rim located thereon and steel pulleys or rollers are provided between the adjacent recesses to co-operate therewith so as to move the parts of the hub or the like transversely against the action of suitable springs thus effecting an absorption of road or transmission shocks or both.

In applying my invention to a resilient wheel for vehicles the rim of the wheel is provided with a pair of side plates mounted so as to rotate freely between a pair of flanges on the hub. These side plates are secured to each other at a fixed distance apart and a pair of slidable plates are mounted between them on the hub of the wheel and adapted to slide in a lateral direction but not to rotate thereon. These slidable plates and the fixed plates on the wheel rim are each provided with oppositely facing conical recesses and steel balls are placed between these pairs of recesses so that when the rim of the wheel and its plates tend to move relatively to the hub either in a circumferential or up and down direction these balls will ride up the sides of the conical recesses and so cause the slidable plates on the hub to be pressed in a lateral direction. Suitable springs or other resilient means are provided to oppose the movement of these plates thus effecting an absorption of the shocks transmitted from the rim of the wheel to the hub or vice versa.

When applying my invention to a pulley, gear wheel or the like for the transmission of power the pulley is mounted upon a bearing on the hub so as to be free to rotate thereon concentrically with its axis and means are provided to locate the rim of the pulley on the hub in a lateral direction. Fixed and slidable plates are mounted upon the hub and the rim respectively or vice versa and springs or other resilient means are arranged between the slidable plates so as to tend to force them apart and toward the fixed plates. Wedge shaped grooves are provided in both these sets of plates and steel balls or rollers are arranged in these wedge shaped recesses so as to cooperate therewith to force the slidable plates toward each other against the action of the springs so as to absorb transmission shocks between the rim of the pulley and the hub.

In a modification the hub of the pulley may be provided with a number of radial blocks mounted in guides so as to be capable of sliding radially against the action of suitable springs or other resilient means. Wedge shaped recesses are provided between these blocks and the pulley and balls or rollers are located therein so as to co-operate with the wedge shaped recesses to absorb transmission shocks between the rim of the hub and the pulley.

In order that my invention may be more readily understood reference is made to the accompanying sheets of illustrative drawings in which:—

Fig. 4 is a half cross section through a pulley for transmitting power by means of a belt drive and provided with a hub constructed according to my invention so as to absorb transmission shocks.

Fig. 5 is a cross section of an end plate and Fig. 6 is a half side elevation of the same to an enlarged scale and showing the wedge shaped recesses therein, and Figs. 7 and 8 are side elevation and part cross section of a modified construction of pulley for the resilient transmission of power.

Figure 1:
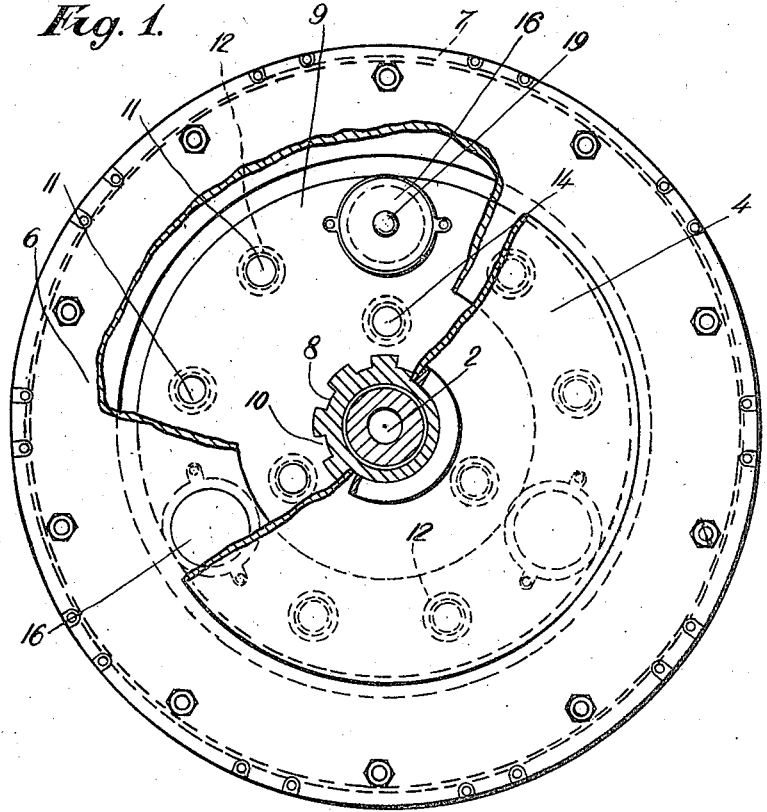
Fig. 1 is a side elevation partly in section of a convenient construction of hub for the wheels of vehicles adapted to absorb both road and transmission shocks.
Figure 2:
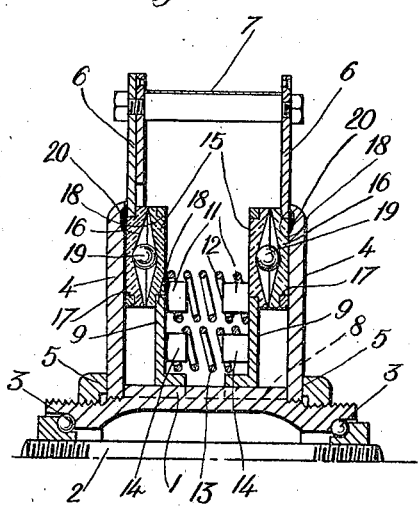
Fig. 2 is a half cross section of the same and Fig. 3 is a half end elevation.
Figure 3:
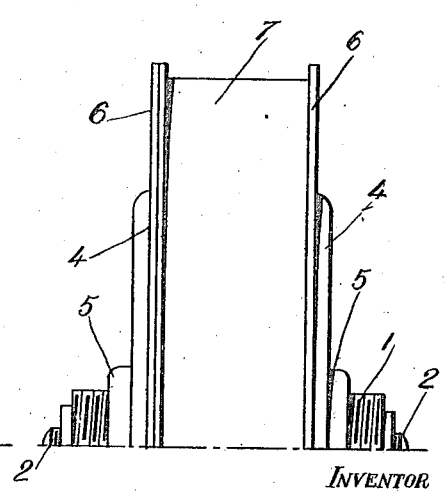

Referring to Figures 1, 2 and 3, this shows a construction of hub suitable for the wheels of motor cycles or like road vehicles but which may readily be modified to provide a construction suitable for practically all other forms of vehicles. In this case the centre 1 of the hub is mounted to rotate upon a fixed spindle 2 upon ball bearings 3 in the well known manner and a pair of fixed flanges 4 are secured upon fixed hub centre 1 by screw threaded nuts 5.

Between the two flanges 4 are mounted a pair of fixed side plates 6 so as to be free to move relatively to the flanges 4 both in a circumferential and radial direction but located laterally so as to prevent side play. Between these side plates 6 is located a tubular distance piece 7 which forms a casing for the hub and they are secured by a series of transverse bolts which lock them together at a fixed distance apart. The rim and tread of the wheel are mounted upon these side plates 6 by means of wire spokes in the case of a wire wheel, suitable discs in the case of a disc wheel and wooden spokes for an artillery wheel or in any other suitable manner in accordance with the purpose for which the wheel is to be used.

Upon the exterior of the hub centre 1 is provided a series of transverse keyways 8 and a pair of slidable plates 9 are mounted on this hub centre 1 and provided with teeth 10 which engage in the keyways 8 so that the plates 9 are keyed upon the hub centre 1, but free to slide thereon in a lateral direction.

A series of studs 11 are provided on the inner faces of the two slidable plates 9 to locate the ends of a series of coil springs 12 arranged between them so as to tend to press these plates 9 apart and toward the fixed side plates 6 upon which the rim of the wheel is mounted.

A second series of coil springs 13 are arranged between the plates 9 and located at their ends by the studs 14. This second series of springs 13 are shorter than the springs 12 and are intended to act as auxiliary or buffer springs which come into operation only when heavy shocks require to be absorbed.

A series of hollow steel cones 15 and 16 are secured in holes 17 and 18 in the fixed plates 6 and the slidable plates 9 respectively. These hollow steel cones 15 and 16 are arranged in pairs so that one member of each pair is located in one of the fixed side plates 6 and the other in one of the slidable plates 9 and their hollow conical ends face toward each other and between them are located steel balls 19 as shown more particularly in Figure 2.

The operation of the hub is as follows:—

If a shock be transmitted from the rim of the wheel either in a radial direction through striking an obstruction on the road or in a circumferential direction owing to irregularity in the transmission of the power, the fixed plates 6 upon which the rim of the wheel is mounted, will tend to move relatively to the slidable plates 9 either in a radial or circumferential direction. In both cases this will cause the oppositely facing hollow steel cones 15 and 16 to move relatively to each other so that their centres are displaced. The steel ball 19 will thus be caused to ride upon the conical sides of the recesses in these cones and will cause the slidable plates 9 to be pressed toward each other against the action of the springs 12. If the shock is of a sufficiently heavy nature the plates 9 will move to such an extent as to engage against the springs 13 which will thus be brought into use to resist any further movement and thus enable the absorption of the heavier shocks. When the shock has been absorbed the balls 19 will again become located between the centres of the cones owing to the springs 12 and 13 tending to press the slidable plates 9 apart thus causing the balls to move toward the greatest depth of the cones 15 and 16. It will thus be seen that both road and transmission shocks will be effectively and resiliently absorbed and damped out; each and all of the hollow cones 15 and 16 and the springs 12 and 13 co-operating to produce this effect and acting to produce a smooth and soft relative motion between the two portions of the hub so that the shocks are distributed between all the springs 12 and if necessary the auxiliary springs 13.

Suitable packing 20 is provided upon the inner face of the flanges 4 so as to bear against the outer faces of the fixed discs 6 carrying the rim of the wheel. This packing 20 serves to retain lubricant within the hub so as to ensure its free operation.

Referring to Figures 4, 5 and 6 these show a suitable construction for application to a driving pulley for the transmission of power by a belt.

The hub centre 1 in this case is intended to be attached directly to the shaft upon which the pulley is to be mounted. Recesses 21 are provided upon opposite ends of this hub centre 1 for the reception of side plates 22 adapted to rotate in the recesses 21 which act as bearings therefor. These side plates 22 are fixed in the supplementary hub 23 of the pulley casting 24 which carries the pulley rim 25 for the reception of the belt or other driving means. The periphery of the centre hub 1 between the recesses 21 on its end is provided with transverse keyways 8 as previously described with reference to Fig. 1.

A pair of slidable plates 26 are provided with similar teeth which engage therein and these plates 26 are resiliently pressed apart by means of springs 27 located at their ends on pins 28 on the plates 26.

The side plates 22 shown in detail in Figs. 5 and 6 are provided with a circumferential projection 29 which engages between the outer face of the central hub and the hub centre 1 and the inner face of the supplementary hub 23 of the pulley 24 and a series of wedge shaped circumferential depressions 30 are provided in this projection and in the outer face of each of the slidable plates 26. Steel balls 31 are located in these recesses between the slidable plates 26 and the side plates 22 so that relative rotation between pulley 24 carrying side plates 22 and the hub centre 1 carrying slidable plates 26, will cause the balls 31 to ride along these wedge shaped depressions so as to force the two slidable plates 26 toward each other against the action of the springs 27 tending to force them apart. The pins 28 upon which the ends of these springs are located, are made of a suitable length to limit the movement of the side plates 26; their ends coming in contact with each other when this limit of movement has been reached. By this means transmission shocks between the rim and hub of the pulley will be resiliently absorbed, thus decreasing wear and tear upon the machinery and the belts or other transmission gearing and so increasing its life and effecting a smoother transmission.

Referring now to Figs. 7 and 8, the hub centre 1 is provided with a number of recesses 32 in each of which is located a block 33 adapted to slide in a radial direction therein against the action of springs 34. The supplementary hub 23 of the pulley 24 is mounted directly upon the hub centre 1 and wedge shaped recesses 35 are provided in the inner face of the supplementary hub 23 and the outer ends of the slidable blocks 33, and steel or other rollers 36 are located in these depressions. Relative rotation between the pulley 24 and the hub centre 1, will cause these rollers to slide over the wedge shaped recesses so as to force the slidable blocks 33 inwardly in a radial direction against the action of the springs 34, thus absorbing transmission shocks between the hub and pulley.

I claim.

1. In a spring wheel the combination of a hub, transverse keyways in said hub, laterally movable side plates engaging in said keyways springs acting between said side plates, a rim member, side plates associated with said rim member, inclined sided recesses in said side plates on the rim and in the side plates on the hub and rotary members engaging between said recesses.

2. In a spring wheel the combination of a hub, transverse keyways in said hub, laterally movable side plates engaging in said keyways springs acting between said side plates, fixed side plates on said hub, a rim member, side plates associated with said rim member, said side plates being disposed between the fixed and movable side plates on the hub, inclined sided recesses in said side plates on the rim and in the laterally movable side plates on the hub, and rotary members engaging between said recesses.

3. In a spring wheel, the combination of a hub, transverse keyways in said hub, movable plates engaging in said keyways, springs acting on said plates, a rim member, portions associated with said rim member having inclined sided recesses, said movable plates also having inclined sided recesses, and rotary members located between said recesses.

HARRY NEWMAN BROWN.